(12) United States Patent
Hines et al.

(10) Patent No.: US 8,639,177 B2
(45) Date of Patent: Jan. 28, 2014

(54) LEARNING ASSESSMENT AND PROGRAMMATIC REMEDIATION

(75) Inventors: Michael Frederick Hines, Sammamish, WA (US); Michael F. Koenig, Bellevue, WA (US); Tara Prakriya, Redmond, WA (US); Subha Bhattacharyay, Bellevue, WA (US); Anuraag Tiwari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 12/117,196

(22) Filed: May 8, 2008

(65) Prior Publication Data

US 2009/0280466 A1    Nov. 12, 2009

(51) Int. Cl.
G09B 7/00    (2006.01)

(52) U.S. Cl.
USPC .............................. 434/350; 434/322; 434/323

(58) Field of Classification Search
USPC .......................................... 434/322, 323, 350
See application file for complete search history.

(56) References Cited

U.S. PATENT DOCUMENTS

| | | | |
|---|---|---|---|
| 4,175,339 A * | 11/1979 | Jones | 434/326 |
| 5,002,491 A * | 3/1991 | Abrahamson et al. | 434/322 |
| 5,658,161 A * | 8/1997 | Roberts et al. | 434/353 |
| 5,738,527 A * | 4/1998 | Lundberg | 434/322 |
| 5,788,508 A * | 8/1998 | Lee et al. | 434/350 |
| 5,947,747 A * | 9/1999 | Walker et al. | 434/354 |
| 6,015,297 A * | 1/2000 | Liberman | 434/322 |
| 6,030,226 A * | 2/2000 | Hersh | 434/236 |
| 6,039,575 A * | 3/2000 | L'Allier et al. | 434/323 |
| 6,077,085 A * | 6/2000 | Parry et al. | 434/322 |
| 6,149,438 A * | 11/2000 | Richard et al. | 434/322 |
| 6,175,841 B1 * | 1/2001 | Loiacono | 715/205 |
| 6,260,033 B1 * | 7/2001 | Tatsuoka | 706/45 |
| 6,301,571 B1 * | 10/2001 | Tatsuoka | 706/45 |
| 6,302,698 B1 * | 10/2001 | Ziv-El | 434/323 |
| 6,315,572 B1 | 11/2001 | Owens et al. | |
| 6,347,943 B1 | 2/2002 | Fields et al. | |
| 6,366,760 B1 * | 4/2002 | Kucinski et al. | 434/359 |
| 6,386,883 B2 * | 5/2002 | Siefert | 434/322 |
| 6,471,521 B1 * | 10/2002 | Dornbush et al. | 434/322 |
| 6,523,007 B2 * | 2/2003 | Layng et al. | 704/270 |
| 6,749,436 B1 * | 6/2004 | Dannenberg | 434/323 |
| 6,758,754 B1 * | 7/2004 | Lavanchy et al. | 463/42 |
| 7,014,467 B2 | 3/2006 | Krebs et al. | |
| 7,153,140 B2 | 12/2006 | Ivanir et al. | |
| 7,286,793 B1 * | 10/2007 | Miele | 434/362 |
| 7,641,592 B2 * | 1/2010 | Roche | 482/9 |
| 2002/0052860 A1 * | 5/2002 | Geshwind | 706/62 |
| 2002/0164563 A1 * | 11/2002 | Wasowicz et al. | 434/178 |

(Continued)

OTHER PUBLICATIONS

"Topic Area Descriptions", http://www.educause.edu/content.asp-?page_id=9296&bhcp=1.

(Continued)

Primary Examiner — Robert J Utama

(57) ABSTRACT

Learning content may be provided to a user where the learning content may contain learning objectives. A response to the learning content may be received. The response may be analyzed by determining whether the response was the proper response to the learning objectives. If the response was a proper response, less questions on the learning objective may be presented in the future and the if response was an improper response, additional questions on the learning objective may be presented in the future.

15 Claims, 4 Drawing Sheets

(56) References Cited

U.S. PATENT DOCUMENTS

| | | |
|---|---|---|
| 2003/0027122 A1* | 2/2003 | Stansvik .................. 434/323 |
| 2003/0039949 A1 | 2/2003 | Cappellucci et al. |
| 2003/0211447 A1 | 11/2003 | Diesel et al. |
| 2004/0018479 A1* | 1/2004 | Pritchard et al. .......... 434/350 |
| 2004/0121298 A1* | 6/2004 | Creamer et al. ........... 434/322 |
| 2004/0259068 A1* | 12/2004 | Philipp et al. ............. 434/350 |
| 2005/0026118 A1* | 2/2005 | Chen et al. ................. 434/159 |
| 2005/0147946 A1 | 7/2005 | Ramamurthy et al. |
| 2005/0191609 A1* | 9/2005 | Fadel et al. ................ 434/322 |
| 2005/0233296 A1* | 10/2005 | Ziv-el et al. ............... 434/350 |
| 2007/0009872 A1* | 1/2007 | Sonsteng et al. .......... 434/350 |
| 2007/0111184 A1* | 5/2007 | Sperle ......................... 434/350 |
| 2007/0111185 A1 | 5/2007 | Krebs |
| 2007/0122788 A1* | 5/2007 | Stevens, Jr. ................ 434/323 |
| 2007/0143130 A1* | 6/2007 | Hearn .............................. 705/1 |
| 2008/0021769 A1 | 1/2008 | Higgins et al. |
| 2008/0254437 A1* | 10/2008 | Heffernan et al. .......... 434/362 |
| 2009/0047648 A1* | 2/2009 | Ferreira ...................... 434/323 |
| 2010/0047758 A1* | 2/2010 | McCurry et al. ........... 434/353 |
| 2010/0099070 A1* | 4/2010 | Abrahamson et al. ...... 434/350 |

OTHER PUBLICATIONS

"Learning in a Technology-Rich Environment", North Carolina State University, 2004, pp. 1-90.

"Learning Technology", http://lttf.ieee.org/learn_tech/issues/january2005/index.html.

* cited by examiner

LEARNING ASSESSMENT AND PROGRAMMATIC REMEDIATION

BACKGROUND

This Background is intended to provide the basic context of this patent application and it is not intended to describe a specific problem to be solved.

Education through electronic means is becoming more common. Teachers and students often use electronic authoring tools to create class materials and record live lectures, and more and more schools are moving to broadcasting lectures across the Internet. Further, a variety of electronic educational materials are available from various sources as interactive study tools. However, electronic content and interactive tools often have a fixed script and cannot adapt to a user's strength or weaknesses. In addition, the programs that use these electronic materials cannot get to the root cause why a user may be having difficulty in a particular topic. Nor do any currently existing tools provide programmatic remediation of those identified root causes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of computerized programmatic assessment and remediation of learning is disclosed. Learning content may be provided to a user. Learning content may be a question and a plurality of answers where the questions and answers related to learning objectives. A response to the learning content may be received. The response may be analyzed by determining whether the response was the proper response. If the response was a proper response, a learning objective in the question and in the proper response may be identified. An indication that the user correctly met the learning objective in the question and in the correct answer may be stored. If the response was an improper response, the learning objective in the question and in proper response may be identified. Also, the learning objective in the improper response selected may be identified. An indication that the user did not meet the learning objective in the question, in the proper response and in the improper response selected may be stored. An analysis page may be displayed to the user. The analysis page may include a number of questions attempted, a number of questions correctly answered, a number of questions incorrectly answered and a date and time when questions were answered, the satisfied learning objectives, the unsatisfied learning objectives, potential root causes for the failure to meet unsatisfied learning objectives, and learning content that the user can interact with to remediate the deficiency in the root cause learning objectives.

As a result, the user is not just told what learning objective they got wrong, but why they got it wrong, and what they can do to improve. Thus, a user's learning experience will be vastly improved. If the user understands a learning objective, it will not be emphasized. If the user does not understand the learning objective, it, or its component skills can be emphasized in the future. In addition, the analysis will be at the lower, more granular level, where the user's misunderstanding exists, rather than at the higher, concept level, where many learning objectives may interplay and only learning objective may be the basis of the student's misunderstanding. The questions may be designed by learning professionals to specifically target learning objectives or the knowledge of learning professionals may be used to quickly identify the most common learning objective misunderstandings. The results of the responses to the learning objectives may be compiled into a report that quickly and easily identifies user's learning objective strengths and weaknesses.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term ' . . . ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
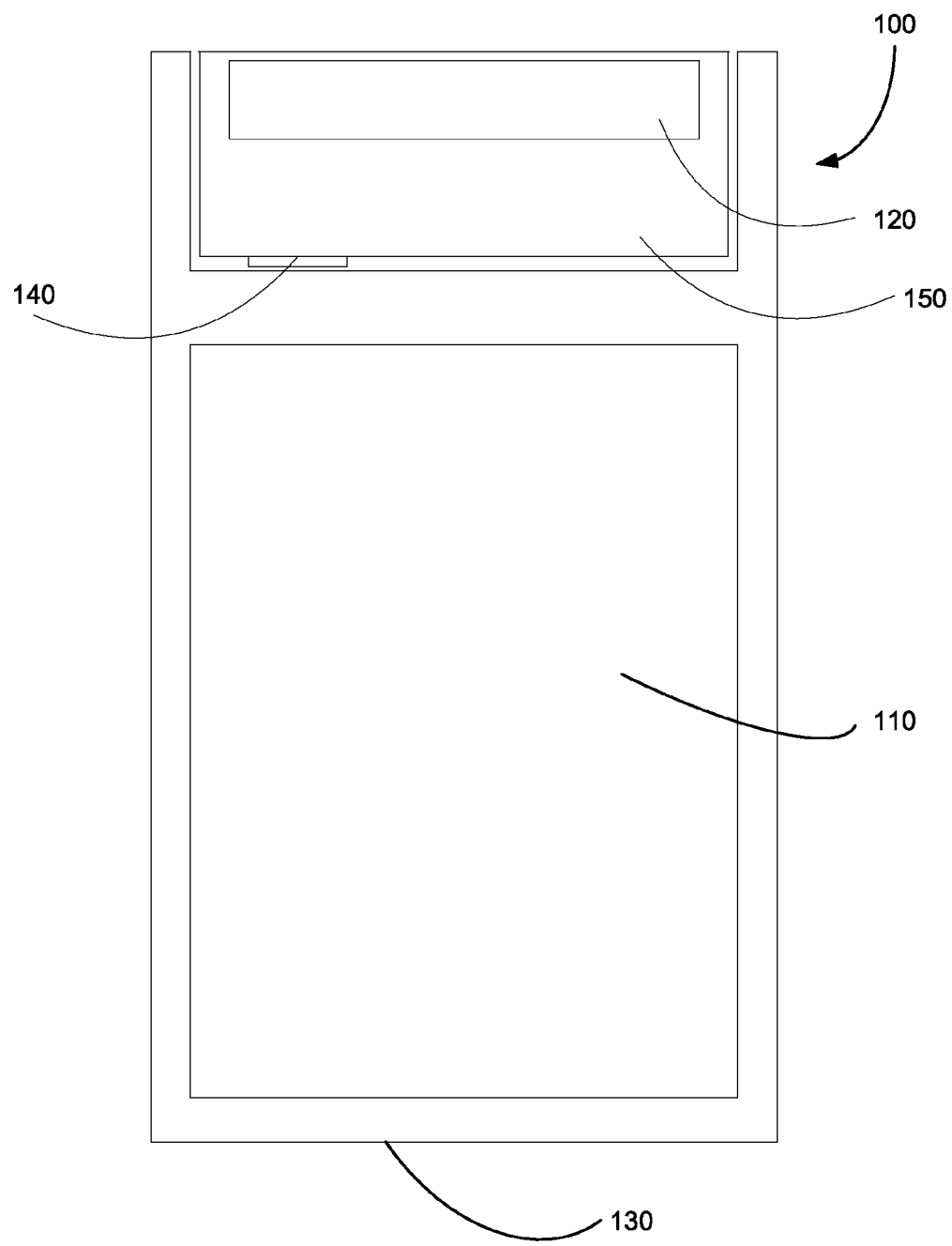
FIG. 1 is an illustration of a portable computing device.

FIG. 1 may be an illustration of a portable computing device 100. Portable computing devices 100 may be adapted to store and play a variety of file types such music files (for example, wav files, mp3 files, etc.), video files (for example, wav files, mpeg files, mpeg4 files, etc.), photo files (for example, jpeg, gif, etc.) or any other type of electronic data file. Music files are not just traditional music files but also may include podcasts, voice recordings, audio books, etc. The devices 100 may also have an FM radio, an AM radio, a satellite receiver or a TV tuner to receive broadcasts from a variety of sources. Additional features are certainly available such as a WiFi ability, ability to transmit music, photos or video to another device, ability to record voices, ability to take photos or videos, ability to make telephone calls, ability to accept GPS signals and calculate locations, ability to play video games, keep calendars, keep contacts, take notes, etc. The device 100 may an input area 110. The device 100 may also have a display 120.

In some embodiments, the device 100 may be separable into two portable devices. A first portable device 130 may include the input area 110 and an interface 140 for a second portable device 150. The second portable device 150 may contain a display 120 and an interface 140 to communicate with the first portable device 130. The second portable device 150 may contain a processor, the first portable device 130 may contain a processor or both may contain a processor.

Figure 2:
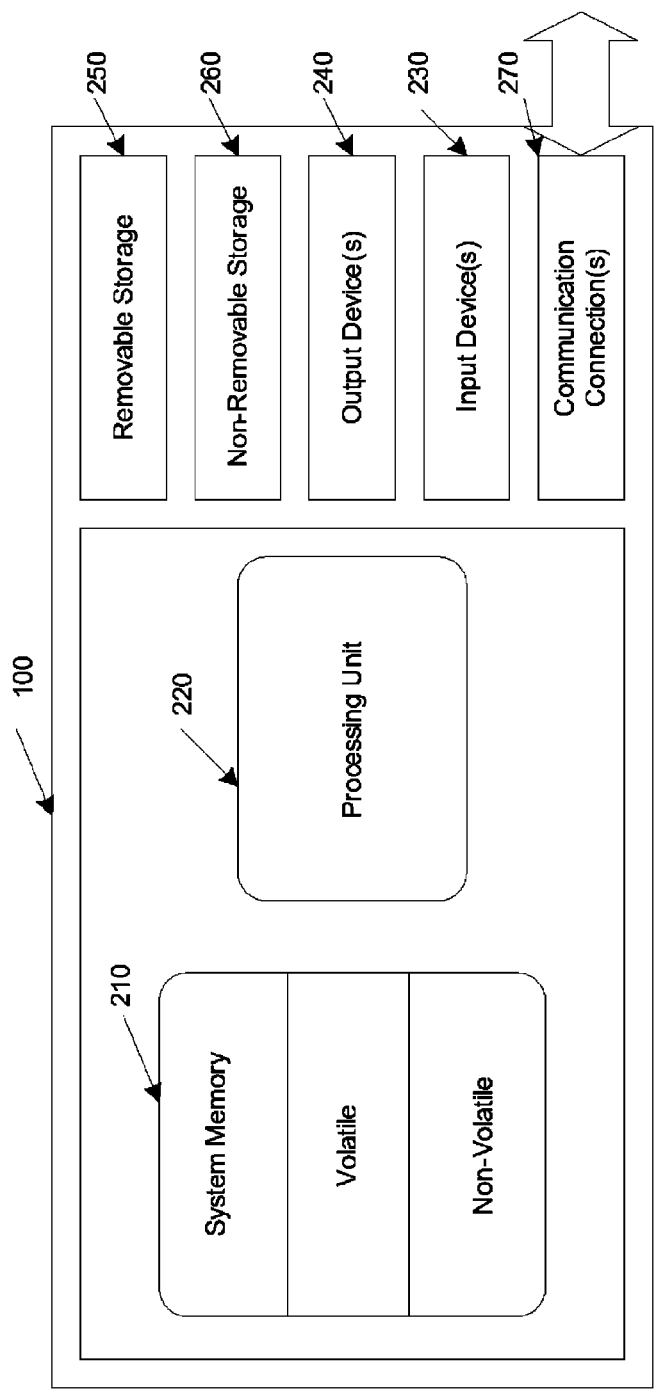
FIG. 2 is an illustration of a computing system.

FIG. 2 may be an illustration of the hardware used in the portable computing device 100. The device 100 may have a memory 210, a processing unit 220, an input area 230 such as the input area 110 (FIG. 1), an output device 240 such as a display 150 (FIG. 1) and a power source (not shown). The memory 210 may be volatile (such as RAM), non-volatile (such as ROM, flash memory, etc.) or some combination of the two.

The device 100 may also include additional storage (removable and/or non-removable) including, but not limited to, magnetic or optical disks or tape or any other memory that can be easily rewritten, may keep data for long periods of time when power is removed and may allow quick and efficient access to data. Such additional storage is illustrated in FIG. 2 by removable storage 250 and non-removable storage 260. Computer storage media includes volatile and nonvolatile, removable and non-removable media implemented in any method or technology for storage of information such as computer readable instructions, data structures, program modules or other data. Memory 210, removable storage 250 and non-removable storage 260 are all examples of computer storage media. Computer storage media includes, but is not limited to, RAM, ROM, EEPROM, flash memory or other memory technology. Any such computer storage media may be part of device 100.

The processing unit 220 may be any processing unit 220 capable of executing computer code to decode data from a compressed format into a useable form fast enough such that music and video may be played continuously without skips or jumps. It may also be useful if the processor 220 is efficient in using power to increase the life of the power source. The device 100 may also contain communications connection(s) 270 that allow the device 100 to communicate with other devices. Communications connection(s) 270 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery, an input from a power converter or another portable power source. The display 120 may be a color LCD screen or other display type that fits inside the device 100.

Figure 3:
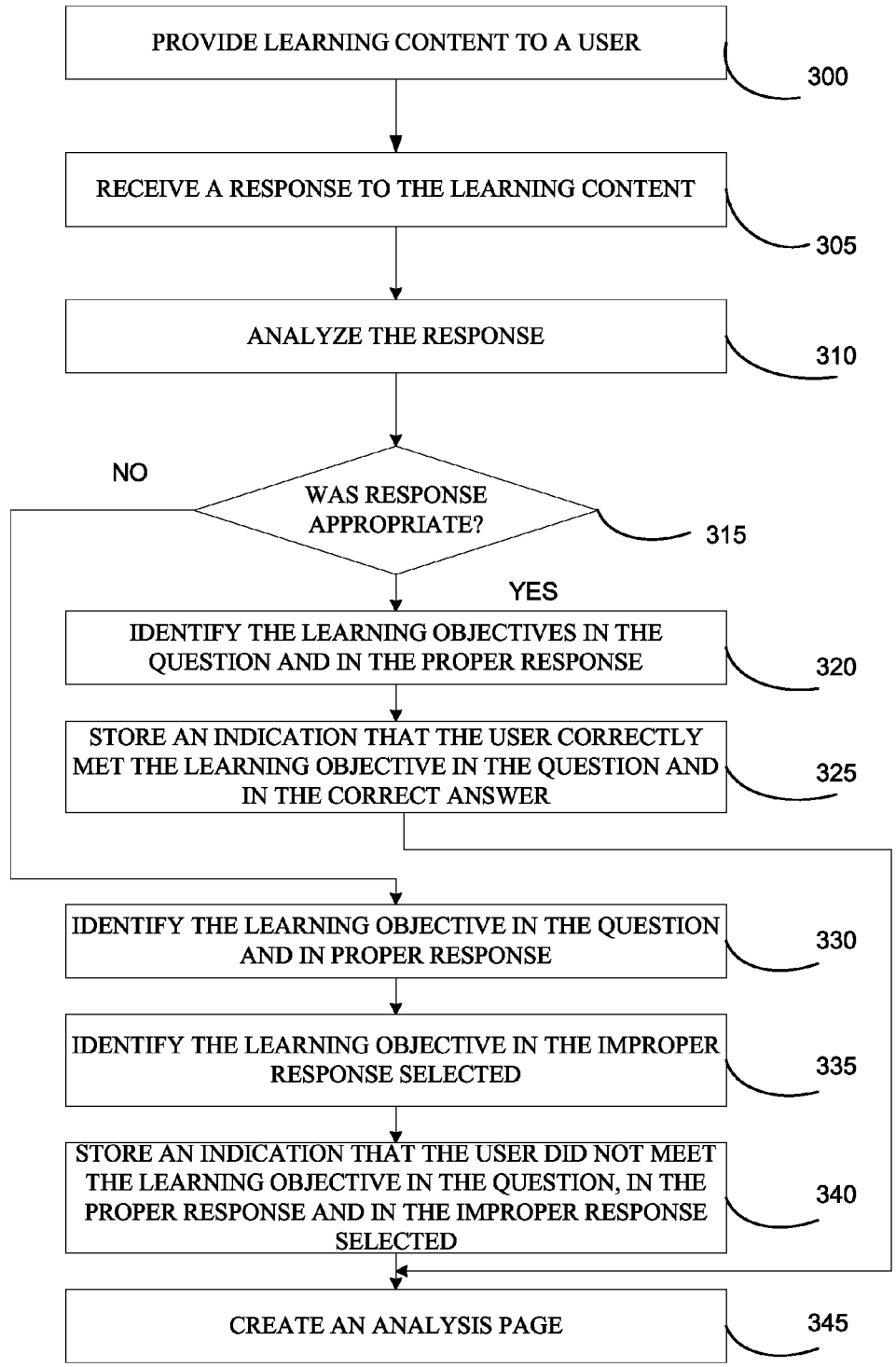
FIG. 3 is an illustration of a method of computerized programmatic assessment of learning.

FIG. 3 is an illustration of a method of computerized programmatic assessment of learning. In general, interactive programs in the past have provided questions and accepted answers. However, improperly answered questions can often have several causes or misunderstood learning objectives. For example, the Pythagorean Theorem requires the skill to square numbers, add numbers and take the square root of numbers. If a user cannot satisfy any of these learning objectives, the higher level concept of being able to use the Pythagorean Theorem will not be successful. By breaking down questions into smaller learning objectives, root causes of learning difficulties may be identified and addressed.

At block 300, learning content may be provided to a user. Learning content is a broad concept in that it may contain videos, audio files, tutorials, question and answer session and any other content that may be use to teach an individual about a topic or topics. In one embodiment, questions and answers are used to test a users understanding of learning objectives in the learning content. Leaning objectives may be more granular and may be considered the building blocks of understanding for a subject. For example, a learning concept may be math and a leaning objective may be addition.

At block 305, a response is received to the learning content. The response may be an answer to a question, such as the selection of an answer from a plurality of answers or in the form of a written answer. The responses may be stored in a memory 210. The response may be on a desktop computer 400 (FIG. 4) or on a portable computing device 100 such as the computer device in FIG. 1, that is in communication, either continuously or on occasion, with a second computing device, such as in FIG. 2.

In other embodiments, the user may be permitted to express doubt about a concept. The doubt input may be accepted and stored in a memory 210. It then may be communicated to a learning professional, such as a teacher of a class. In addition, doubt context may be communicated to the learning professional. Doubt context may be details that may help the learning professional assist the student. For example and not limitation, the doubt context may include content being displayed to the user at the time of the doubt input, past work by the user related to the content, past work by the user related to the doubt input and a time that the doubt input was entered. Of course, other doubt context may be possible, depending on the leaning content. A doubt response may be received from the learning professional.

In yet another embodiment, a work input space may be displayed for a user to input answer data. Answer data may include data that is used to work out an answer to the problem such as the steps in setting up and solving an equation. The answer data also may be analyzed to determine what is the learning objective or objectives that are troubling a user. The answer data may be stored in a memory 210.

At block 310, the response may be analyzed. The analysis may include reviewing the answers, reviewing the questions, reviewing the doubt input and reviewing the work input for learning objectives that were understood or were not understood.

At block 315, the response will be reviewed to determine if it was a proper response: In multiple choice questions, it is simple to determine if the proper choice was selected. In other formats, the written response may be reviewed to determine if it was a proper response. If the response contains input beside multiple choice input, an application may scan the answer for key words and concepts. Of course, other responses of different types may be reviewed and the review may occur in a variety of manners.

At block 320, if the response was a proper response, the learning objectives in the question and in the proper response may be identified. In one embodiment, when the questions are designed, the learning objectives are noted and stored in a memory 210. In addition, the answers may be designed to also test learning objectives. For example, a correct answer may require the use of addition where an incorrect answer may use subtraction, another incorrect answer may user division and yet another incorrect answer may use multiplication. By assigning incorrect answers pre-identified learning objectives, the ability of a user to properly apply a skill or knowledge may be tested.

At block 325, an indication that the user correctly met the learning objective in the question and in the correct answer may be stored. In this way, learning objectives understood by a user will not be emphasized and where learning objectives not understood will be emphasized, thereby improving learning. Control may then pass to block 345.

At block 330, if the response was an improper response, the learning objective in the question and in proper response may be identified. As stated previously, in one embodiment, when the questions are designed, the learning objectives are noted and stored in a memory 210. In addition, the answers may be designed to also test learning objectives. For example, a correct answer may require the use of addition where an incorrect answer may use subtraction, another incorrect answer may user division and yet another incorrect answer may use multiplication. By assigning one or more pre-identified learning objective(s) to incorrect answers, the ability of a user to properly apply the proper action may be tested.

At block 335, the learning objective in the improper response selected may be identified. If an improper response was selected or created, it may provide insight into the lack of understanding on the part of the user. For example, if a user used subtraction instead of addition, this may be identified by providing an incorrect answer that purposefully used the incorrect operator.

At block 340, an indication that the user did not meet the learning objective in the question, in the proper response and in the improper response selected may be stored. The stored learning objectives and whether the objectives were understood or not may be used to guide future learning. For example, if a learning objective is not understood, more instruction and testing may be provided on this objective. In addition, if a learning objective is understood, fewer questions may be asked about this learning objective in the future. In one embodiment, a lookup table is used to provided additional questions or content related to the learning objectives that have been identified as needing additional work. For example, if the misunderstood learning objective is addition, the lookup table may be used to identify all the additional questions and other learning content that relates to the learning objective of addition and this content may be presented to the user. The presentation may be random, in a predetermined sequence or in an order created by a learning professional. Of course, many sequences are possible and are contemplated.

If there are unsatisfied learning objectives, a failure analysis may be performed to identify the causes of the unsatisfied learning objectives. Unsatisfied learning objectives causes may be learning concepts that are not understood and are most likely to cause the unsatisfied learning objectives. The causes may be determined in a variety of ways. In one embodiment, historical data is used to identify the causes. For example, studying a statistically significant number of users may indicate that taking square roots may be a common cause of incorrect answers about the Pythagorean Theorem. In another example, a specific user may be studied and causes may be identified by studying the individual's responses to specific questions about learning objectives. In another embodiment, learning professionals may use their professional experience to identify unsatisfied learning objectives causes. For example, learning professionals may immediately know that taking square roots is the most common cause for missing questions related to the Pythagorean Theorem.

Figure 4:
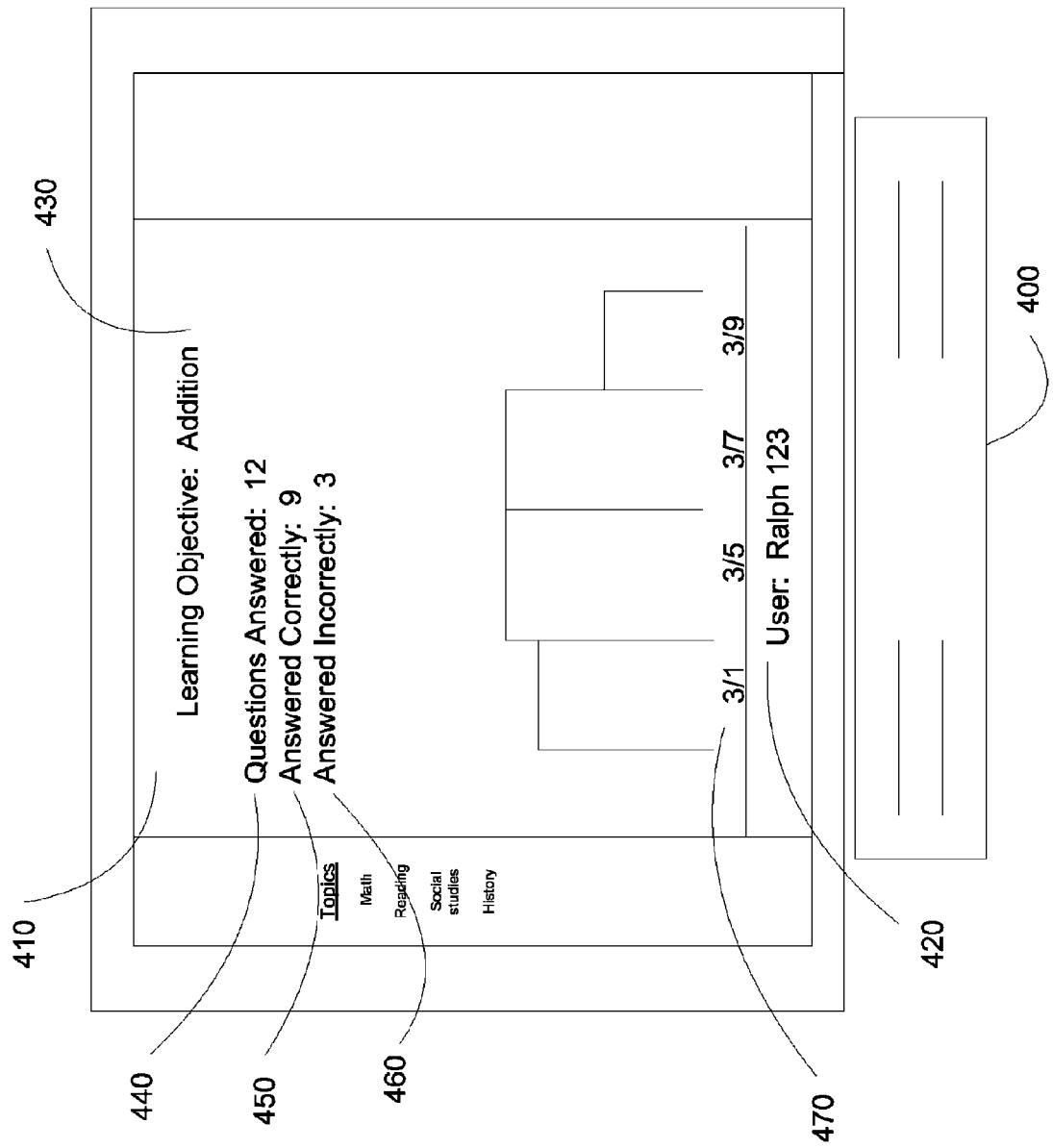
FIG. 4 is an illustration of a sample report.

At block 345, an analysis page may be created. FIG. 4 is an illustration of a sample analysis page 410. The analysis page 410 may be specific to user, for a class, or for virtually any defined population 420. The analysis page 410 may be displayed to a user or to a supervisor, such as a class teacher. The analysis page 410 may include a variety of details such as the satisfied learning objectives 430, the unsatisfied learning objectives (not shown), a number of questions attempted 440, a number of questions correctly answered 450, a number of questions incorrectly answered 460 and a date and time 470 when questions were answered. By viewing the analysis page 410, the user or a professional will see the raw data that lead to the conclusion that certain learning objectives have been met and that others have not been met.

As a result, a user's learning experience will be vastly improved. If the user understands a learning objective, it will not be emphasized. If the user does not understand the learning objective, it, or its component learning objectives will be emphasized in the future. In addition, the analysis will be at the lower, more granular level, where the user's misunderstanding exists, rather than at the higher, concept level, where many learning objectives may interplay and only learning objective may be the basis of the student's misunderstanding. The questions may be designed by learning professionals to specifically target learning objectives or the knowledge of learning professionals may be used to quickly identify the most common learning objective misunderstandings. The results of the responses to the learning objectives may be compiled into a report that quickly and easily identifies user's learning objective strengths and weaknesses.

The invention claimed is:

1. A method of computerized programmatic assessment of learning comprising:
  providing learning content to a user, wherein the learning content comprises a question and a plurality of answers, and wherein the question and at least one of the plurality of answers are each associated with learning objectives;
  receiving an individual answer selected by the user;
  determining whether the selected answer was correct; and
  in an instance where the selected answer was incorrect:
    identifying the learning objective associated with the question and the learning objective associated with a correct answer to the question,
    identifying the learning objective associated with the selected answer,
    storing an indication that the user did not meet the learning objective associated with the question or the learning objective associated with the correct answer, and storing the learning objective associated with the selected answer, and
    allowing the user to express doubt about a concept by:
      accepting a doubt input,
      communicating the selected answer, the correct answer, the doubt input, and a doubt context to a learning professional, wherein the doubt context comprises past work by the user related to the doubt input and a time that the doubt input was entered, and
      presenting to the user the learning objective associated with the correct answer, why the user got the learning objective associated with the correct answer wrong, and what the user can do to improve,
  wherein at least the determining is performed by a computing device.

2. The method of claim 1, further comprising:
  displaying a work input space for the user to input answer data wherein the answer data is data used to work out the selected answer to the question; and
  storing the answer data in a memory.

3. The method of claim 1, further comprising displaying an analysis page to the user wherein the analysis page comprises at least one selected from a group comprising:
- met learning objectives;
- unmet learning objectives;
- a number of questions attempted;
- a number of questions correctly answered;
- a number of questions incorrectly answered; and
- a date and time when questions were answered.

4. The method of claim 1, further comprising designing answers to questions that identify individual learning objectives that are not understood.

5. The method of claim 1, further comprising in an instance where the selected answer does not satisfy individual learning objectives, displaying additional questions that have answers associated with the unsatisfied individual learning objectives.

6. The method of claim 1, further comprising, in an instance where the selected answer does not satisfy an individual learning objective:
- displaying another question that has at least one answer associated with the unsatisfied individual learning objective and at least one answer associated with a different individual learning objective.

7. The method of claim 1, further comprising, in an instance where there are unsatisfied learning objectives for the user:
- identifying past unsatisfied learning objectives for the user;
- determining whether the past unsatisfied learning objectives are present in the learning content; and
- in an instance where the past unsatisfied learning objectives are present in the learning content, displaying additional content related to the past unsatisfied learning objectives.

8. The method of claim 1, further comprising, in an instance where there is a plurality of unsatisfied learning objectives, using a failure analysis to identify a root cause of the plurality of unsatisfied learning objectives.

9. The method of claim 8, wherein the failure analysis is based on historical data.

10. The method of claim 8, wherein the failure analysis is created using experience from other learning professionals to determine the root cause of the plurality of unsatisfied learning objectives.

11. The method of claim 1, wherein the doubt context comprises at least one selected from a group comprising:
- content being displayed to the user at the time of the doubt input; and
- past work by the user related to the content, and further comprising receiving a doubt response from the learning professional.

12. A computer system comprising a processor, a memory and an input/output circuit, the processor being configured to execute computer executable instructions causing actions, comprising:
- providing learning content to a user, wherein the learning content comprises a question and a plurality of answers, and wherein the question and at least one of the plurality of answers are each associated with a different learning objective;
- receiving an individual answer submitted by the user;
- determining whether the submitted answer was correct; and
- in an instance where the submitted answer was incorrect:
  - identifying the learning objective associated with the question and the learning objective associated with a correct answer to the question,
  - identifying the learning objective associated with the submitted incorrect answer,
  - storing an indication that the user did not meet the learning objective associated with the question or the correct answer, and storing the learning objective associated with the submitted incorrect answer, and
  - allowing the user to express doubt about a concept by:
    - accepting a doubt input, and
    - communicating the submitted answer, the correct answer, the doubt input, and an associated doubt context to a learning professional, wherein the associated doubt context comprises:
      - the learning content being displayed to the user at a time that the doubt input was entered, wherein the learning content also includes a work input space, the work input space includes the individual answer and additional data used to work out the individual answer to the question,
      - past work by the user related to the learning content, and
      - the time that the doubt input was entered to the work input space.

13. The computer system of claim 12, further comprising computer executable instructions for:
- in an instance where there are unsatisfied learning objectives:
  - using a failure analysis to identify a root cause of the unsatisfied learning objectives based on a history of submitted incorrect answers; and
  - displaying an additional question and answers related to the unsatisfied learning objective.

14. The computer system of claim 13, further comprising computer executable instructions for creating the failure analysis from at least one selected from a group comprising:
- using historical data; and
- using data experience from other learning professionals to determine unsatisfied learning objectives causes.

15. A system comprising a processor, the processor being configured to execute computer executable instruction causing action, comprising:
- providing a learning content to a user, wherein the learning content comprises one or more concepts;
- receiving an answer from the user, the answer corresponding to a question related to the one or more concepts; and
- allowing the user to express doubt about at least one of the one or more concepts by:
- accepting a doubt input; and
- communicating the answer, a correct answer to the question, the doubt input, and an associated doubt context to a learning professional, wherein the associated doubt context comprises:
- the learning content being displayed to the user at a time that the doubt input was entered, wherein the learning content also includes a work input space, the work input space includes the answer and additional data used to work out the answer to the question;
- past work by the user related to the learning content; and
- the time that the doubt input was entered to the work input space.

* * * * *